(12) United States Patent
Lehner et al.

(10) Patent No.: US 8,973,893 B2
(45) Date of Patent: Mar. 10, 2015

(54) METHOD AND DEVICE FOR DETERMINING THE ACTUAL START OF INJECTION OF A PIEZO FUEL INJECTION VALVE

(75) Inventors: Steffen Lehner, Eichstätt (DE);
Manfred Kramel, Mintraching (DE);
Hans-Jörg Wiehoff, Regensburg (DE);
Nicolas Nozeran, Tegernheim (DE);
Peter Matthias Ruβe, Tegernheim (DE)

(73) Assignee: Continental Automotive GmbH, Hannover (DE)

( * ) Notice: Subject to any disclaimer, the term of this patent is extended or adjusted under 35 U.S.C. 154(b) by 251 days.

(21) Appl. No.: 13/699,101

(22) PCT Filed: May 4, 2011

(86) PCT No.: PCT/EP2011/057147
§ 371 (c)(1),
(2), (4) Date: Feb. 13, 2013

(87) PCT Pub. No.: WO2011/144452
PCT Pub. Date: Nov. 24, 2011

(65) Prior Publication Data
US 2013/0133748 A1 May 30, 2013

(30) Foreign Application Priority Data
May 21, 2010 (DE) .......................... 10 2010 021 169

(51) Int. Cl.
*F16K 31/02* (2006.01)
*F02D 41/24* (2006.01)
(Continued)

(52) U.S. Cl.
CPC .............. *F16K 31/02* (2013.01); *F02D 41/247* (2013.01); *F02M 51/0603* (2013.01);
(Continued)

(58) Field of Classification Search
CPC .............. F16K 31/008; F02K 51/0603; F02K 63/0026; F02D 41/401; F02D 2041/2055; F02D 2200/063

USPC ........ 251/129.01, 129.06; 123/472, 478, 480, 123/490, 491, 494, 498; 239/5, 73, 102.2, 239/533.2, 533.3, 533.4; 73/114.45, 73/114.46, 114.47, 114.48, 114.49; 310/311, 316.03, 317, 323.06, 326, 310/327
See application file for complete search history.

(56) References Cited

U.S. PATENT DOCUMENTS 3,194,162 A * 7/1965 Williams ....................... 417/322
4,793,313 A * 12/1988 Paganon et al. ................ 123/506
(Continued)

FOREIGN PATENT DOCUMENTS

DE       3830510 C1    12/1989    ............. F02M 65/00
DE      19952057 A1     5/2001    ............. F02M 51/06
(Continued)

OTHER PUBLICATIONS

International Search Report and Written Opinion, Application No. PCT/EP2011/057147, 12 pages, Jul. 11, 2011.

*Primary Examiner* — Matthew W Jellett
(74) *Attorney, Agent, or Firm* — King & Spalding L.L.P.

(57) ABSTRACT

A method for determining the actual start of injection is performed by an actuating device for a piezo fuel injection valve and includes the following steps. First, a test injection is carried out with such a short actuation duration that a start of shut-off takes place at a time so early that the nozzle needle does not reach the open end position. Said time is predefined by the actuation and is therefore precisely known. Next, the closing time of the nozzle needle is then determined by measurement and evaluation of an electrical variable of the piezo direct drive. Once the closing time and the time of the start of shut-off are known, the actual start of injection is calculated back from the closing time via the start of shut-off. This permits an adequately precise determination of the actual injection quantity in almost every operating state of the internal combustion engine.

14 Claims, 5 Drawing Sheets

(51) Int. Cl.
   *F02M 51/06* (2006.01)
   *F02M 65/00* (2006.01)
   *F02D 41/40* (2006.01)
   *F02D 41/00* (2006.01)
   *F02D 41/20* (2006.01)

(52) U.S. Cl.
   CPC ......... *F02M 65/005* (2013.01); *F02D 41/2432* (2013.01); *F02D 41/2438* (2013.01); *F02D 41/403* (2013.01); *F02D 2200/0618* (2013.01); *F02M 2200/701* (2013.01); *F02D 41/008* (2013.01); *F02D 2041/2051* (2013.01)
   USPC .................. 251/129.06; 73/114.49; 123/490; 123/498; 239/102.2

(56) References Cited

U.S. PATENT DOCUMENTS

| | | | | |
|---|---|---|---|---|
| 6,680,620 B2 * | 1/2004 | Hedenetz et al. | ............. | 324/727 |
| 6,705,294 B2 * | 3/2004 | Shinogle | ........................ | 123/486 |
| 6,766,964 B1 | 7/2004 | Ruehle et al. | ............... | 239/102.1 |
| 6,953,158 B2 | 10/2005 | Liskow | ....................... | 239/102.2 |
| 7,617,813 B2 * | 11/2009 | Pirkl et al. | .................... | 123/490 |
| 7,913,929 B2 * | 3/2011 | Hornby | ...................... | 239/5 |
| 8,260,526 B2 * | 9/2012 | Loeffler et al. | ............... | 701/104 |
| 8,365,704 B2 | 2/2013 | Beilharz et al. | ............... | 123/480 |
| 8,700,288 B2 * | 4/2014 | Huber et al. | .................... | 701/103 |
| 2002/0011762 A1 * | 1/2002 | Klenk et al. | ............ | 310/316.03 |
| 2006/0022554 A1 * | 2/2006 | Mennicken | ............. | 310/316.03 |
| 2008/0028843 A1 * | 2/2008 | Dietl et al. | .................... | 73/118.1 |
| 2008/0265805 A1 * | 10/2008 | Pirkl et al. | .................... | 318/116 |
| 2009/0223490 A1 * | 9/2009 | Pirkl et al. | .................... | 123/478 |
| 2010/0275885 A1 * | 11/2010 | Becker et al. | ................. | 123/478 |
| 2011/0278369 A1 * | 11/2011 | Serra et al. | ........................ | 239/5 |

FOREIGN PATENT DOCUMENTS

| | | | | |
|---|---|---|---|---|
| DE | 19930309 C2 | 12/2001 | ............. | F02D 41/20 |
| DE | 10162250 A1 | 7/2003 | ............. | F02M 51/00 |
| DE | 102005032087 A1 | 1/2007 | ............. | F02D 41/20 |
| DE | 102007033469 A1 | 1/2009 | ............. | F02D 41/20 |
| WO | 2011/144452 A1 | 11/2001 | ............. | F02D 41/24 |

* cited by examiner

METHOD AND DEVICE FOR DETERMINING THE ACTUAL START OF INJECTION OF A PIEZO FUEL INJECTION VALVE

CROSS-REFERENCE TO RELATED APPLICATIONS

This application is a U.S. National Stage application of International Application No. PCT/EP2011/057147 filed May 4, 2011, which designates the United States of America, and claims priority to DE Application No. 10 2010 021 169.9 filed May 21, 2010, the contents of which are hereby incorporated by reference in their entirety.

TECHNICAL FIELD

The disclosure relates to a method for determining the actual start of injection of a piezo fuel injection valve having a direct drive for a high-pressure fuel injection system for internal combustion engines. The disclosure also relates to a device for actuating a fuel injection valve for carrying out the above-mentioned method.

BACKGROUND

In high-pressure injection systems for internal combustion engines, both diesel engines and spark ignition engines, in particular in motor vehicles, electromechanically activated injection valves are preferably used to meter the fuel for the combustion process. In order to meet the continuously increasing requirements which are made of the operating properties of internal combustion engines with respect to the fuel consumption, the power yield, the pollutant emissions and the smooth running of the internal combustion engines, it is necessary to control each individual combustion process as precisely as possible. A significant condition for this is to meter very small quantities of fuel very precisely in terms of timing, with a high repetition accuracy and, if appropriate, in a plurality of different injections per combustion process, that is to say with a high speed, and at very high working pressures into the individual combustion spaces of the internal combustion engines.

SUMMARY

In one embodiment, a method is provided for determining the actual start of injection of a fuel injection valve having a piezo direct drive of a nozzle needle, the method having the steps: carrying out a test injection with such a short actuation period that a start of shut-off occurs so early that the nozzle needle does not reach the opening end position, determining the closing time of the nozzle needle by measuring and evaluating an electrical variable of the piezo direct drive, and calculating back from the closing time to the actual start of injection via the start of shut-off.

In a further embodiment, the electrical variable of the piezo direct drive is the capacitance which can be measured at the electrical supply connections of an assigned piezo actuator. In a further embodiment, during the calculating back the time period between the predefined start of shut-off and the closing time is determined as a closing period of the needle. In a further embodiment, during the calculating back an opening period of the needle is determined on the basis of the closing period by combination with a proportionality factor. In a further embodiment, the proportionality factor is determined from the ratio between the closing speed and the opening speed of the nozzle needle. In a further embodiment, the actual start of injection is determined starting from the closing time by subtracting the closing period and the opening period. In a further embodiment, the associated proportionality factors are determined in advance as a function of a working pressure of the fuel injection valve and/or other operating variables and are made available during operation in a characteristic diagram, in order to calculate the actual start of injection.

In another embodiment, a device is provided for actuating a fuel injection valve having a piezo direct drive, having a computing unit and a memory unit, and having a stored computer program with a program code for carrying out any of the methods disclosed above.

BRIEF DESCRIPTION OF THE DRAWINGS

Example embodiments will be explained in more detail below with reference to figures, in which.

DETAILED DESCRIPTION

Figure 1:
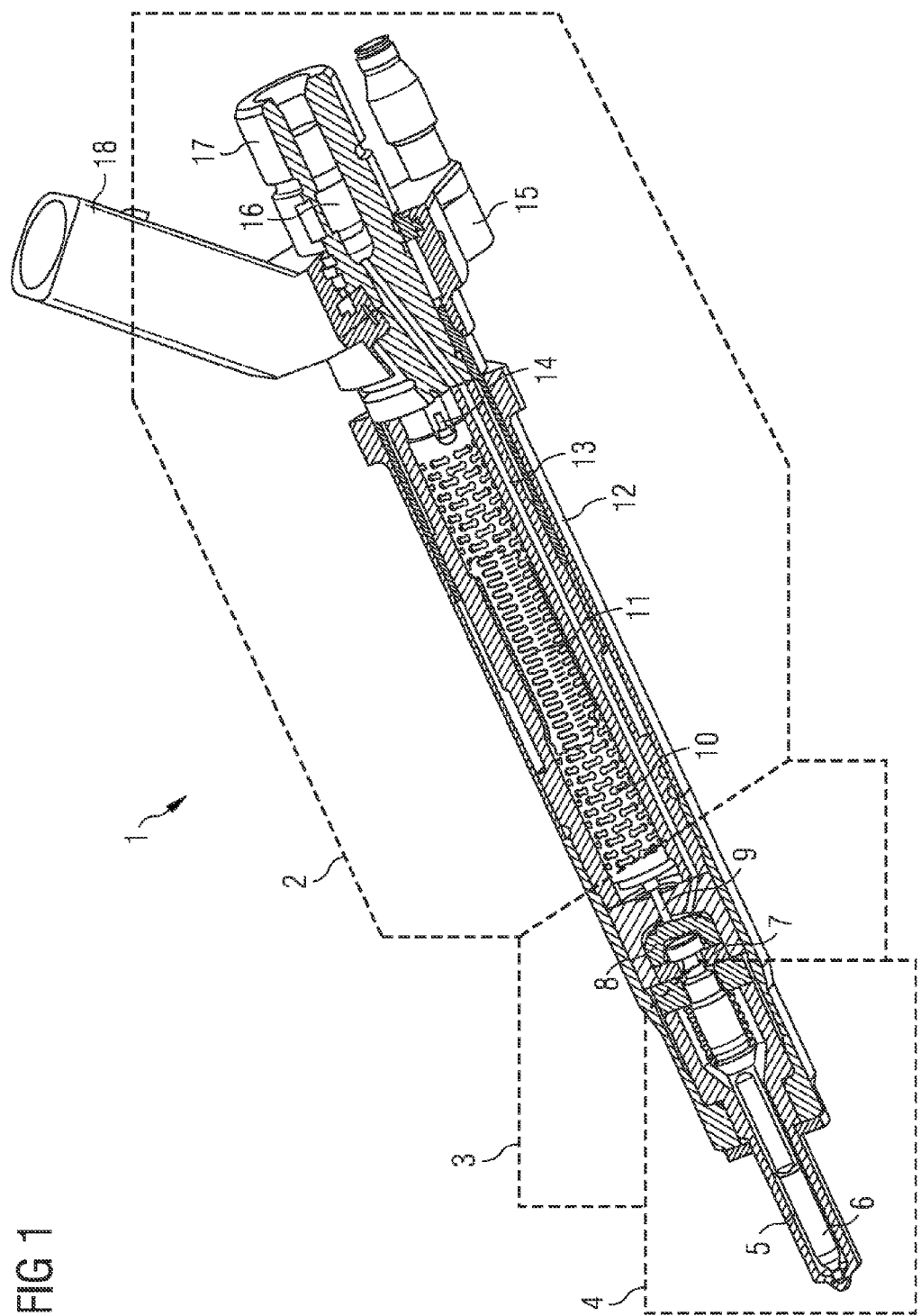
FIG. 1 shows a three-dimensional sectional illustration of a piezo fuel injection valve with direct drive.

In order to permit this, what are referred to as piezo fuel injection valves are used in which by lifting off a valve needle from a valve needle seat the spray holes of the valve are released for the purpose of injection of the fuel into the combustion chamber. In this case, two different functional principles are differentiated. In the conventional design, the valve is activated using the fuel which is present under high pressure, wherein the piezo actuator only activates a control valve in order to control the activation pressure and is decoupled from the nozzle needle. Piezo fuel injection valves of a relatively new design are equipped with a piezo direct drive in which the nozzle needle is activated directly by the piezo actuator via a transmission mechanism. Exemplary embodiments of such piezo fuel injection valves with direct drive are disclosed in documents DE 199 52 057 A1 and EP 1 760 305 A1 and are illustrated in FIG. 1.

The piezo fuel injection valves with direct drive have the advantage over conventional piezo fuel injection valves with hydraulic activation that the stroke of the nozzle needle and therefore the flow rate of the fuel during the injection can be controlled in a variable fashion. By correspondingly actuating the piezo actuator it is therefore possible to shape the injection profile in a variable fashion over time. An example of this is shown by document DE 10 2007 033 469 A1.

However, all these piezo fuel injection valves have in common the fact that they are subject to fabrication tolerances which also change as a function of aging over the service life and due to wear. These tolerances affect, inter alia, the reciprocating movement of the nozzle needle and therefore the opening behavior of the valve, with the result that given a predefined identical actuation the injection time and the injection quantity of the fuel can easily vary as a result of this, which can have adverse effects on the above-mentioned operating properties of an internal combustion engine.

In practice, this problem is resolved with different, complementary methods. A method, referred to as IIC (Injector Individual Coding) method, comprises the injection valves being measured after manufacture with respect to their injection properties and correspondingly classified. Depending on the classification, corresponding correction values are then predefined in the valve control process and taken into account in the valve actuation process.

Another method, referred to as the MFMA (Minimum Fuel Mass Adaptation) method takes place during operation in predefined cycles and under predefined peripheral conditions. In this context, conclusions are drawn about the actually injected fuel quantity on the basis of measurable system variables such as, for example, the pressure drop in the common rail or the change in rotational speed of the crankshaft during predefined test injections. If this fuel quantity differs from the fuel quantity which is expected according to the actuation of the valve, correction values are in turn derived therefrom and are then taken into account during following injections.

In order to further increase the reproducibility of the individual injections, it is helpful to obtain information not only on the injection quantity but also on the actual start of injection, the injection profile and the end of injection. The use of the piezo fuel injection valves with direct drive provides further possible ways of increasing the accuracy of the injection here.

By virtue of its capacitance signal, a piezo actuator permits conclusions to be drawn about force inputs. In the case of a piezo fuel injection valve with direct drive, the nozzle needle is connected to the piezo actuator via rigid coupling elements such as, for example, levers. Force inputs at the nozzle needle are therefore modeled in the piezo signal. As a result, for example the piezo capacitance during the opening process of the nozzle changes as a function of the opposing force acting on the nozzle needle. As the nozzle needle approaches a predefined end stop there is, for example, a significant jump in the capacitance value. The time when the nozzle needle approaches the opening stop, that is to say is completely opened, referred to as operation point 2, can be very precisely determined, as can the closing time, when the nozzle needle comes to a stop in the nozzle seat, referred to as the operation point 4 (OPP4), on the basis of the capacitance signal.

The aforementioned multiplicity of additional influences and an inadequate significance of the change in capacitance at the opening time make it, however, impossible to determine the actual opening time, that is to say the actual start of injection, with sufficient accuracy in this way.

Thus, some embodiment provide a method that makes it possible to determine the opening time, that is to say the actual start of injection, in a piezo fuel injection valve with direct drive with sufficient accuracy.

For example, some embodiments provide a method for determining the actual start of injection of a fuel injection valve having a piezo direct drive of a nozzle needle having the following steps. At first, a test injection is carried out with such a short actuation period that a start of shut-off occurs so early that the nozzle needle does not reach the opening end position. This is necessary so that no dwell time of the nozzle needle at the opening stop occurs, which is undesired for the further execution of the method.

The start of shut-off is here the time at which the actuation of the piezo actuator reverses the current flow and therefore the direction of stroke of the piezo actuator and therefore of the nozzle needle, in other words, the start of closing of the nozzle needle. This time is predefined by the actuation process and is therefore exactly known.

In the next step, the closing time of the nozzle needle is then determined by measuring and evaluating an electrical variable of the piezo direct drive. The electrical variable which is used for this may be the capacitance value of the piezo actuator, since this has a significant profile in the form of a local minimum at the closing time.

Once the closing time and the time of the start of shut-off are known, it is possible to calculate back from the closing time via the time of the start of shut-off to the opening time, and therefore to the actual start of injection, provided that the stroke speeds of the nozzle needle in the closing stroke and in the opening stroke are known, which can be determined, for example, on a representative experimental basis.

As long as there is a sufficiently significant occurrence of the measured electrical variable at the closing time, a chronological error which possibly occurs during the back calculation can be minimized by shortening the test injection, that is to say by reducing the injection quantity. In an extreme case, the injection quantity can be reduced to zero. This corresponds to actuation of the nozzle needle in such a way that it is relieved of the closing force but is still just not lifted out of its seat. As a result, for example during reference measurements, faults due to deviating opening speeds and closing speeds of the nozzle needle can be eliminated.

The device for actuating a piezo fuel injection valve having a direct drive has, inter alia, a computing unit and a memory unit. A computer program with a program code is stored in the device, for example in the memory unit. This computer program serves to carry out the method for determining the actual start of injection of a fuel injection valve having a piezo direct drive, as described above, when the program is executed on the computing unit. The device for actuation can be embodied as part of a superordinate control device, for example the engine controller. In the case of internal combustion engines with a plurality of cylinders, it is possible to provide an assigned device for actuating the respective piezo fuel injection valve per cylinder or else an actuation device which is jointly responsible for all the cylinders and which serves the individual piezo fuel injection valves of the respective cylinders alternately.

The time of the actual start of injection can therefore be determined easily and sufficiently precisely. After the closing time and the time of the start of shut-off are also known, the actual opening period and the stroke height of the nozzle needle can also be determined. Furthermore, by using further measurement variables such as, for example, the rail pressure, the actually injected fuel quantity can be determined computationally and, if appropriate, by using characteristic diagrams. Through the subsequent comparison of the actual fuel quantity with the setpoint fuel quantity during the test injection it is possible to determine corresponding correction factors which are used to increase the injection accuracy during further operation.

Advantageous refinements are disclosed in the dependent claims.

The electrical capacitance (C) which can be measured at the electrical supply connections of an assigned piezo actuator can advantageously be used as an electrical variable of the piezo direct drive to be employed for the evaluation. This permits precise determination of the closing time ($T_S$) of the nozzle needle since this value has at this time a particularly significant profile which is also referred to as operation point 4 (OPP4) and which can be recognized with a high degree of reliability in the signal profile.

In the calculation profile it is easily possible to determine the time period between the predefined time of the start of shut-off ($T_A$) and the closing time ($T_S$) as closing period ($T_S$) of the needle since the two times follow one another in the profile and the time interval between these two points constitutes the closing period ($t_S$).

Under the condition that the closing period ($t_S$) and the opening period ($t_O$) of the nozzle needle are in a known ratio to one another, it is possible, during the calculating back, to determine an opening period ($t_O$) of the needle on the basis of the closing period ($t_S$) by combination with a corresponding proportionality factor ($F_P$) which reflects this ratio.

This proportionality factor ($F_P$) can easily be determined from the ratio between the closing speed ($V_S$) and the opening speed ($V_O$) of the nozzle needle. This ratio is obtained if the equations for the stroke height of the nozzle needle for the opening stroke ($h_O = t_O \times V_O$) and the closing stroke ($h_S = t_S \times V_S$) are made equivalent and the ratio of the opening period to the closing period ($t_O/t_S = V_S/V_O$ or $F_P = V_S/V_O$). In this context, the opening speed and the closing speed are assumed to be known, possibly previously measured, variables.

The actual start of injection can therefore be determined on the basis of the closing time ($T_S$) by subtracting the closing period ($t_S$) and the opening period ($t_O$), which in total provide the actual injection period ($t_E$).

A further improvement of the method described above can be achieved in that the associated proportionality factors are determined in advance in trials as a function of a working pressure of the fuel injection valve, that is to say at various working pressures within a pressure range, such as can occur in later real operation, and said proportionality factors are made available during operation in a characteristic diagram for the purpose of the calculation of the actual start of injection, while taking into account the current working pressure. In this context it is also possible to take into account other operating variables with which the proportionality factor has a dependent relationship, such as for example the working temperature or the state of wear.

The proportionality factors can be determined representatively, for example on the basis of a structurally identical pattern of the fuel injection valve by means of trials and can be predefined for all the structurally identical fuel injection valves. However, it is also possible to determine, subsequent to the manufacturing process of any fuel injection valve on a test bench, the proportionality factors which are valid for this individual valve, and to make them available specifically for this valve. For this purpose, the values which are determined are combined in a respective characteristic diagram and stored in the memory unit of the device for actuating the valve. These measures increase the accuracy and extend the field of use of the claimed method to the extent that the influences of a working pressure which changes during operation can also be taken into account in the determination of the actual start of injection. There is therefore no need firstly to bring about specific peripheral conditions with respect to the working pressure in order for the method to be carried out precisely.

Figure 4:
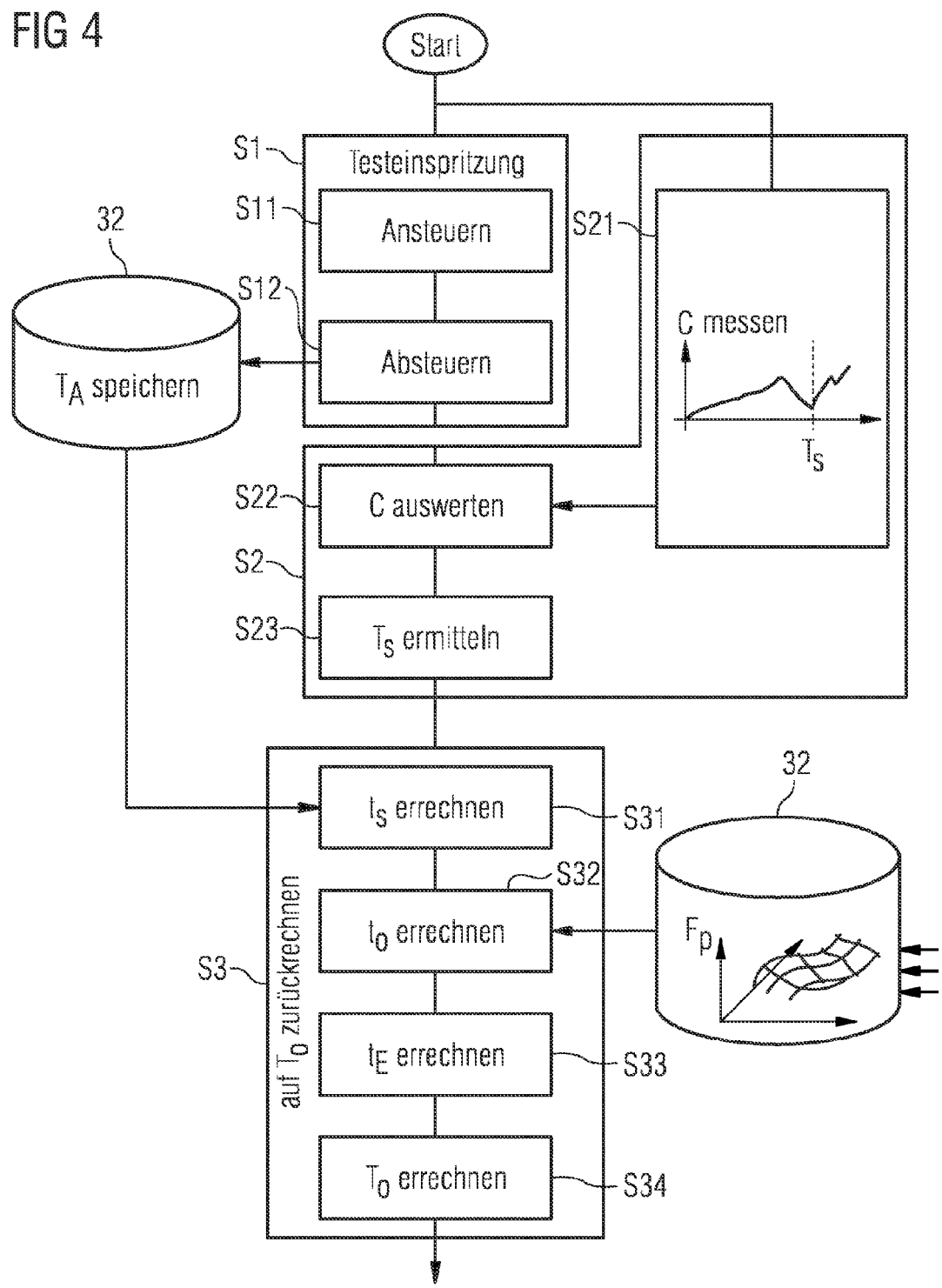
FIG. 4 shows a flowchart of an exemplary embodiment of the method.

While FIG. 1 shows the basic design of a piezo fuel injection valve 1 with a direct drive, in FIG. 4 the arrangement thereof is illustrated in the entire system of the internal combustion engine. The piezo fuel injection valve 1 is comprised essentially of three functional units, the actuator unit 2, the amplifier unit 3 and the nozzle unit 4. The actuator unit 2 has the piezo element 11, accommodated in a spring sleeve 10, which has a connection plug 14 and is arranged in the actuator housing 12. The high-pressure connection 17 with a fuel filter 16 as well as a leakage return flow connection 15 and a control connection 18 are arranged at the upper end of the actuator housing 12. In the installed state, the piezo fuel injection valve 1 is connected via a high-pressure fuel line via the high-pressure connection 17 to the common rail 26. The fuel is then directed into the nozzle unit 4 through the fuel filter 16 and the high-pressure inflow duct 13. In the installed state, the piezo fuel injection valve 1, in particular the piezo element 11, is connected to the assigned control device 30 via the control connection 18 and a control signal line 39 which is connected thereto.

The amplifier unit 3 is composed of an activation pin 9 which acts as a transmission element between the piezo element 11 and what is referred to as the activation bell 8. The activation bell 8 is in turn in mechanical contact with activation levers 7, which themselves act on the rear end of the nozzle needle 6.

The nozzle needle 6 is associated with the nozzle unit 4 and is arranged in the nozzle casing 5. A pressure spring, which presses the nozzle needle 6 with its tip into the valve seat in the tip of the nozzle casing 5 and therefore keeps the valve closed, acts on the nozzle needle 6.

In order to open the injection valve, a charge current is now fed to the piezo element 11 from the control device via the control connection 18. The piezo element 11 therefore expands and presses on the activation bell 8 by means of the activation pin 9. The activation bell 8 is in turn supported on the outer ends of the activation lever 7 and presses them "down" in the direction of the nozzle tip. The activation levers 7 are supported in the manner of a rocker on an intermediate plate and engage with the respective other inner ends below a mushroom-shaped depression at the end of the nozzle needle. The pressing down of the outer ends of the activation levers 7 causes their inner ends to lift up in the direction of the actuator unit 2 in the manner of a rocker and therefore to lift up the nozzle needle 6, in particular the tip of the nozzle needle, out of its seat, as a result of which the valve in the tip of the nozzle opens and fuel is injected into an associated combustion chamber of an internal combustion engine 20. The maximum stroke of the nozzle needle 6 which can be achieved as a result is limited by the stop against the intermediate plate.

In order to close the injection valve, the flow of current to the piezo element 11 is now reversed by the control device 30, as a result of which said piezo element 11 discharges and shortens. At the start of this process, the piezo element shortens at high speed, with the result that the force which the activation pin 9 applies to the piezo element 11 drops to a minimum. As the discharging proceeds, the speed of the shortening of the piezo element 11 slows. In contrast, the nozzle needle 6 is accelerated by the compression spring in the direction of the nozzle seat in the tip of the nozzle, and the activation bell 8 is accelerated in the opposite direction together with the activation pin 9. The force acting on the piezo element 11 via the activation pin 9 therefore builds up again until the nozzle needle 6 comes against the stop in its seat. Here, the pin movement ends abruptly and the force between the activation pin 9 and the piezo element 11 likewise drops again abruptly. What is important for the execution of the disclosed method is now to know that the capacitance value which is to be measured at the electrical connection plug 14 of the piezo element behaves in an inversely proportional fashion to the force acting on the piezo element 11.

Figure 2:
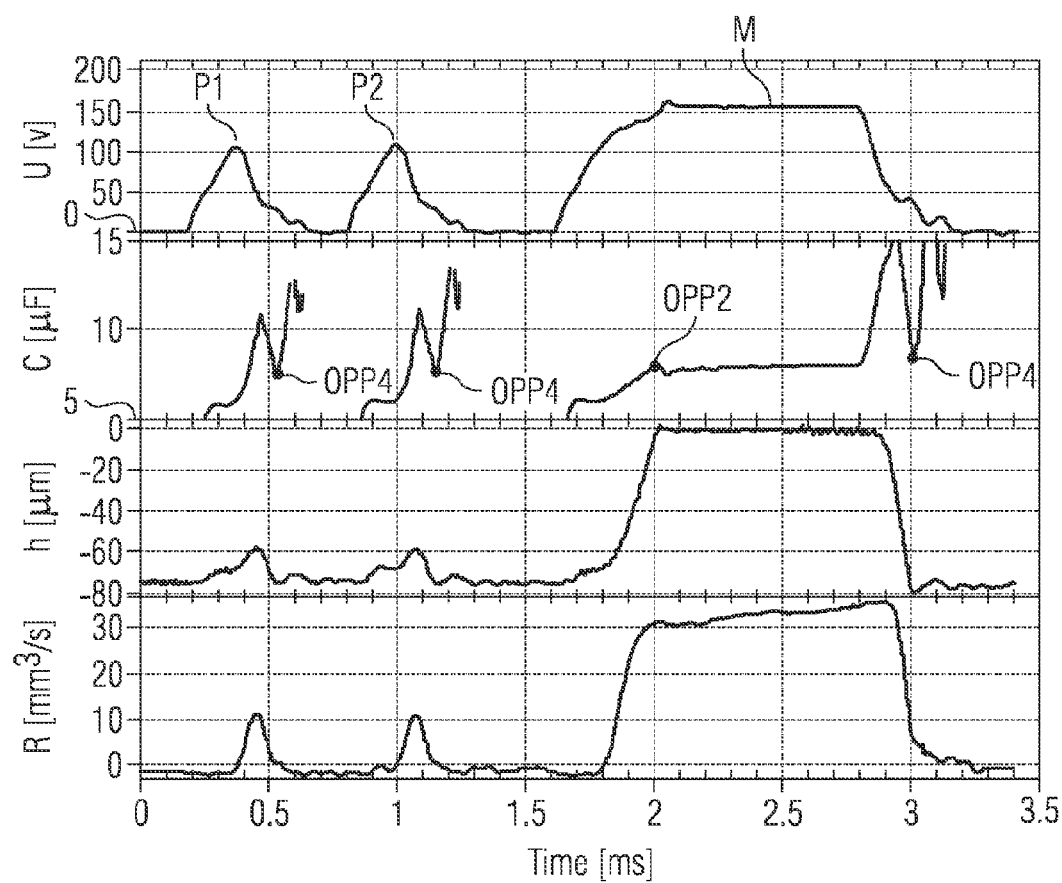
FIG. 2 shows a diagram with the illustration of the chronological profile of various signal variables and measurement variables at the piezo fuel injection valve for a typical injection cycle.

The relationship between the various signal variables and measurement variables of a piezo fuel injection valve, the voltage U, the capacitance C, the needle stroke h and the injection rate R is illustrated in FIG. 2. The four different profile diagrams are arranged with corresponding horizontal time axes one on top of the other, with the result that the relationship can be recognized. The respective measured value profile of the individual variables is illustrated during a customary injection cycle with two short pre-injections and a relatively long main injection, denoted in the voltage diagram by P1, P2 and M. The voltage curve U, the stroke curve h and the injection rate curve R correlate directly, wherein a chronological offset between the voltage curve and the other two curves can be seen. In contrast, the profile of the capacitance curve C differs significantly from the other curve profiles. What is significant here in each case is a local minimum which is denoted as an operation point 4 OPP4, which reflects the time at which the nozzle needle 6 comes to a stop in its seat, and the valve is therefore completely closed. The further operation point 2, characterized by OPP2, in the capacitance profile C reflects the time at which the nozzle needle 6 reaches its maximum stroke, see stroke curve h, in the case of complete opening, and comes to a stop against its "opening stop". It is clearly apparent that the capacitance curve C has in each case a very significant local minimum, OPP4, precisely at the closing time of the nozzle needle, the chronological position of which local minimum can be detected by measuring means clearly and with a high degree of reliability.

Figure 3:
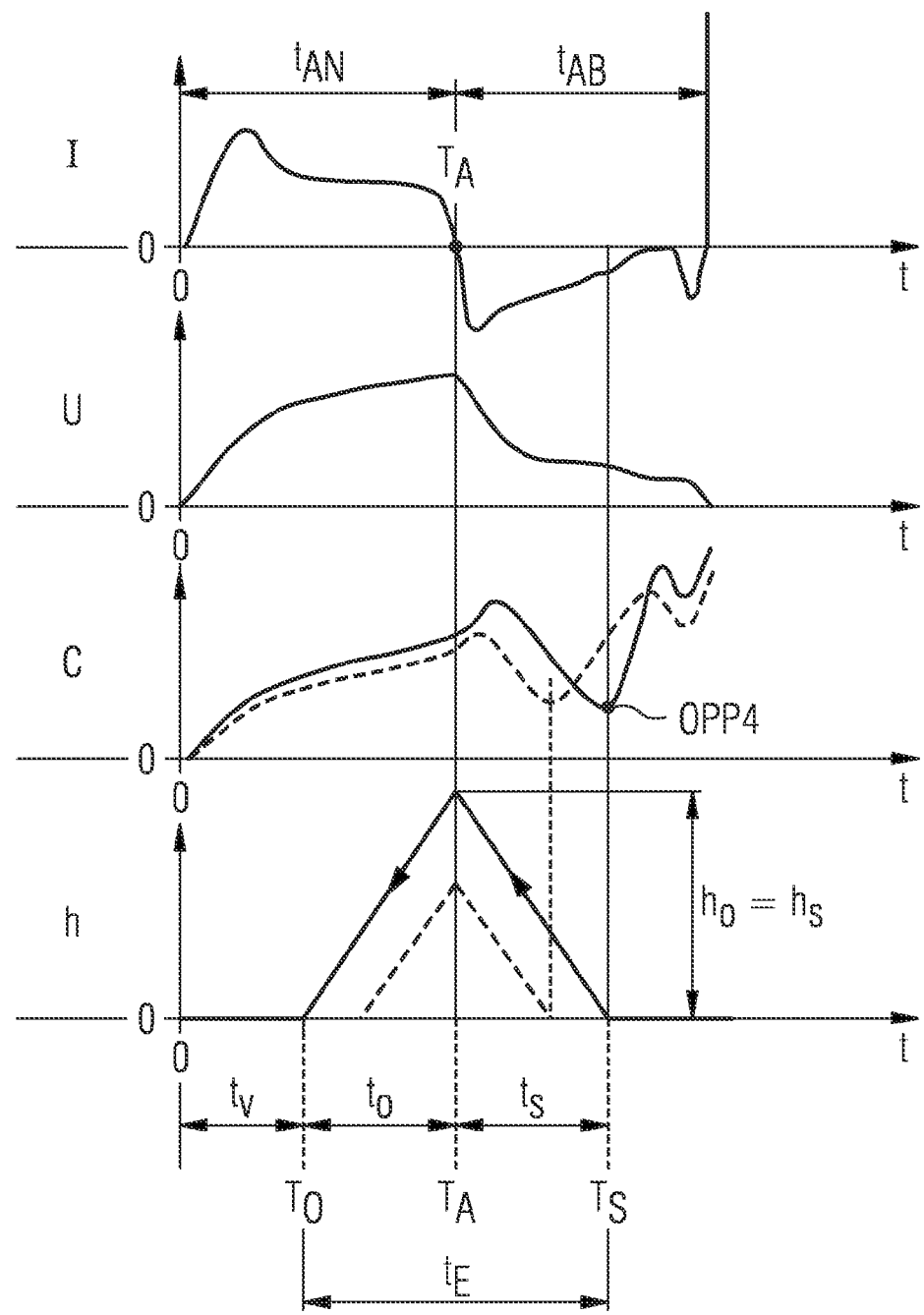
FIG. 3 shows a diagram with the illustration of the chronological profile of the significant electrical signals, the current, the voltage and the capacitance, of the piezo actuator in relation to the stroke travel of the nozzle needle during a test injection.

FIG. 3 illustrates in turn four diagrams of the decisive measurement variables of the piezo fuel injection valve, the current profile I, the voltage profile U, the capacitance profile C and the stroke travel profile h, in a chronological relationship one on top of the other. However, the signal profile during a test injection is illustrated here in a chronologically relatively high resolution, and the times and time periods which are significant for the disclosed method are indicated. In particular, the shut-off time $T_A$ is important as a distinctive point in the current profile curve I. Said distinctive point is characterized by the change of sign of the current value at the zero crossover of the current profile curve. Up to this time, the piezo element 11 is charged and expands in the process, and starting from this time it is discharged again and contracts.

The voltage profile curve U is of subordinate significance in this consideration, it being also possible to read the shut-off time $T_A$ at the point at which the gradient of the voltage curve profile changes sign.

In particular what is referred to as the operation point 4, OPP4, is significant in the capacitance profile curve. Said operation point 4 characterizes a local minimum in the capacitance profile curve and coincides with the closing time $T_S$.

Starting from the two times $T_A$ and TS which are therefore known, the back calculation to the opening time $T_O$, that is to say the actual start of injection, is illustrated in the stroke travel profile curve h. The curve profiles which are indicated by dashed lines in the capacitance profile diagram and stroke profile diagram characterize here the curve profiles in the case of a relatively short closing time. The profile of the method is explained below in conjunction with the block diagram, illustrated by way of example in FIG. 4, of a possible embodiment of the method.

Firstly, in a method step S1, a test injection is carried out. This is composed of the individual steps S11, actuation of the piezo element 11 for an actuation period $t_{AN}$ and S12, shutting off the piezo element 11 for a shut-off period $t_{AB}$. In this context, the actuation period $t_{AN}$ is dimensioned to be so short that the nozzle needle 6 is sure not to reach its opening end position. At the predefined shut-off time $T_A$, the piezo element 11 is discharged again in the step S12 by reversing the flow of current for a shut-off period $t_{AB}$. The shut-off time $T_A$ is recorded in a memory region, provided for this purpose, of a memory unit 32.

In the method step S2, the capacitance value C is firstly measured parallel to the method step S1 in the individual step S21 during the test injection. In the individual step S22, the capacitance profile curve which is recorded is evaluated in order to isolate the operation point 4, OPP4, and the actual closing time $T_S$ of the nozzle needle 6 is determined therefrom in the individual step S23.

In the further method step S3, the back calculation to the actual start of injection then takes place. To do this, in the individual step S31 the closing period $t_S$ of the nozzle needle 6 is firstly calculated as the difference between the closing time $T_S$ and the shut-off time $T_A$. In the next individual step S32, the opening period $t_O$ is determined on the basis of the closing period $t_S$. This can basically occur in different ways. If, for example, it is simply approximately assumed that the gradient of the closing stroke of the nozzle needle 6 over time, that is to say the closing speed $V_S$, corresponds to the gradient of the opening stroke, that is to say to the opening speed $V_O$, the opening period $t_O$ is of the same length as the closing period $t_S$. This simple case is also illustrated in FIG. 3.

However, FIG. 3 also shows how the calculation of the opening period can be carried out in principle at different opening speeds and closing speeds. Starting from the closing time $T_S$, the stroke travel $h_S$ of the nozzle needle is determined with the closing speed $V_S$ which is presumed to be known and the determined closing period $t_S$ (according to $h_S=V_S*t_S$), wherein the closing stroke is to be set as equivalent to the opening stroke, $h_S=h_O$. Starting from the stroke travel $h_O$ of the nozzle needle, it is then in turn possible to determine the opening period $t_O$ (according to $t_O=h_O/V_O$) with the opening speed $V_O$ which is to be presumed to be known.

Owing to the pressure ratios in the injection valve and the mechanical conditions, there is a high probability that the closing speed $V_S$ and the opening speed $V_O$ of the nozzle needle will differ. If it is assumed that the closing speed and opening speed are not the same but are in a specific ratio to one another, this can be taken into account in the calculation using a proportionality factor $F_P$, which represents this ratio. This is obtained from the equalization of the formulas for the closing stroke and the opening stroke as follows:

$h_S=V_S*t_S$ and $h_O=V_O*t_O$ and $h_S=h_O$ to form $V_O*t_O=V_S*t_S => t_O=t_S*V_S/V_O$ where $V_S/V_O=F_P$ yields $t_O=t_S*F_P$ Since the pressure ratios and the mechanical conditions such as, for example, the friction can change as a function of the operating temperature and the rail operating pressure, the prescription of a fixed proportionality factor $F_P$ leads, if appropriate, to imprecise results in the back calculation of the actual start of injection. In order to increase the accuracy of the calculation it is therefore possible to make available a characteristic diagram for the proportionality factor in a memory area of a memory unit 32 which supplies the associated proportionality factor $F_P$ for the back calculation for the respective operating point of the injection valve.

A permanently predefined proportionality factor or a characteristic diagram for the proportionality factor can be determined, depending on the accuracy required, once in a representative fashion for a model series of the piezo fuel injection valve in trials and made available. However, for increased accuracy it is also conceivable to produce a corresponding characteristic diagram for each individual piezo fuel injection valve within the scope of the manufacturing process and to supply it with the piezo fuel injection valve and make it available during operation in a memory unit 32 of a control device 30 for actuating the piezo fuel injection valves.

In the next partial step S33 of the method, the injection period $t_E$ is then determined by adding the closing period $t_S$ and the opening period $t_O$. In the last partial step S34, the opening time $T_O$, and therefore the actual start of injection, is determined by subtracting the injection period $t_E$ from the closing time $T_S$.

If back calculation is then performed from the opening time to the starting time of the test injection, the delay period $t_V$, which is a measure of the idle stroke of the transmission mechanism, is additionally obtained.

Figure 5:
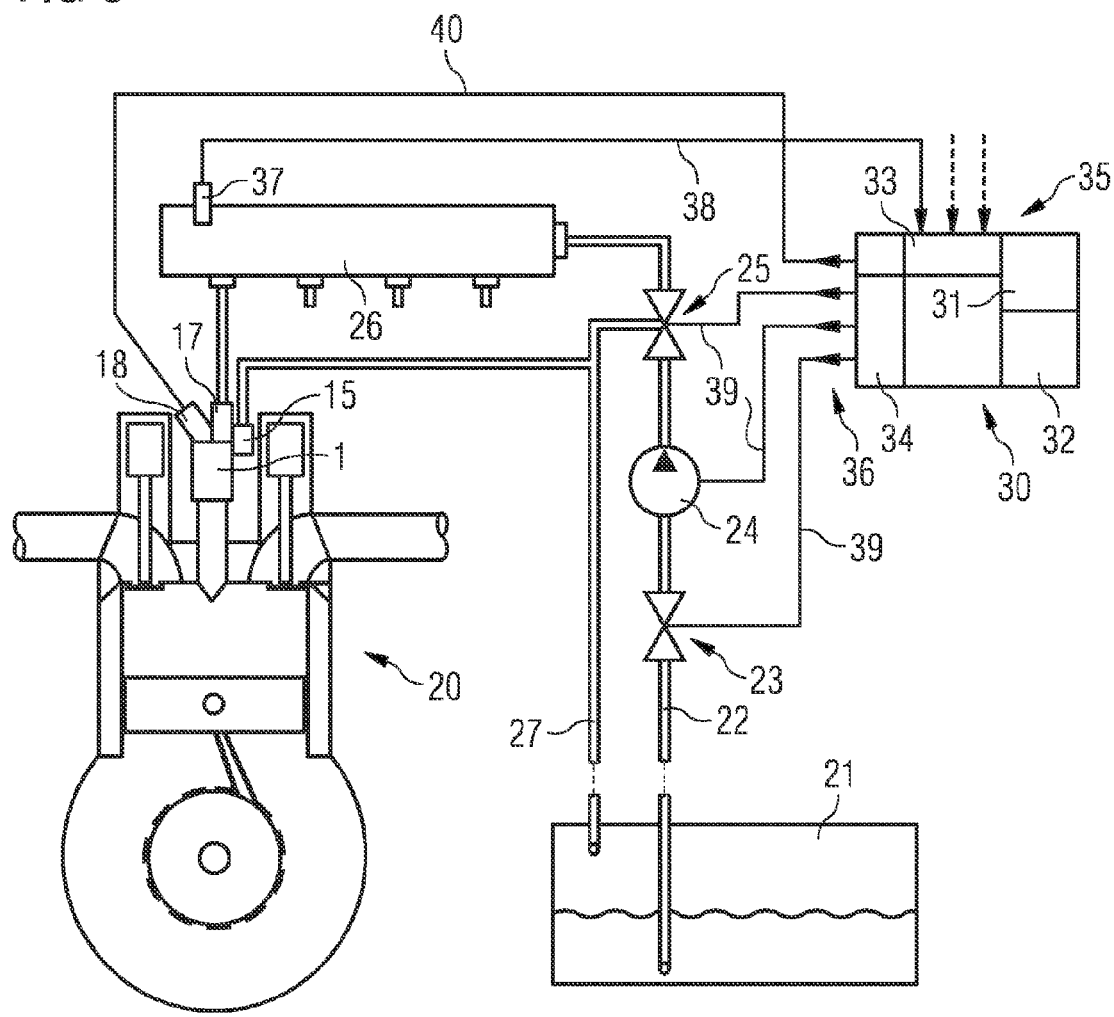
FIG. 5 shows a simplified illustration of an exemplary embodiment of an arrangement of a device for actuating a fuel injection valve having a piezo direct drive.

FIG. 5 shows the arrangement of an example device 30 for actuating a piezo fuel injection valve 1 in an overall arrangement with an internal combustion engine 20. The control device 30 has a computing unit 31 and a memory unit 32 as well as a signal receiver module 33 and a signal generator module 34. The control device 30 is configured to carry out the method disclosed herein for determining the actual start of injection. For this purpose, a computer program with a program code, which when executed on the computing unit 31 carries out the method by accessing the signal receiver module 33 and the signal generator module 34, is stored in the memory unit. For this purpose, the control device 30 is also connected to the control connection 18 of the piezo fuel injection valve 1 via a piezo control measuring line 40.

The connection of the piezo control measuring line 40 is simultaneously assigned to the signal receiver module 33 and to the signal generator module 34 of the control device 30. The piezo control measuring line 40 serves simultaneously to transmit the actuation signals from the control device 30 to the piezo fuel injection valve 1 in order to carry out the test injection within the scope of the disclosed method, and to transmit the measurement signal, representative of the capacitance, from the piezo element 11 of the piezo fuel injection valve 1 to the control device 30. However, in other embodiments separate control and sensor signal lines may also be provided at the piezo fuel injection valve.

The piezo fuel injection valve 1 is arranged in the cylinder head of the internal combustion engine 20 and not only has the control connection 18 but also a high-pressure connection 17 and a leakage return flow connection 15. The piezo fuel injection valve 1 is hydraulically connected to the common rail 26 of the high-pressure injection system via the high-pressure connection 17. The piezo fuel injection valve 1 is hydraulically connected to the fuel tank 21 via the leakage return flow connection 15 and the fuel return line 27. The return flow of fuel which is caused by the permanent leakage of the piezo fuel injection valve 1 is fed back again into the fuel tank 21 via this connection.

The common rail 26 is fed with fuel at a high pressure level from the fuel tank 21 via the fuel feed line 22 by means of the high-pressure pump 24. The high-pressure pump 24 is assigned a metering valve 23 upstream in the fuel feed line 22, and a pressure control valve 25 downstream in said fuel feed line 22. The necessary operating high pressure in the common rail 26 is set by means of the metering valve 23, the high-pressure pump 24 and the pressure control valve 25. A rail pressure sensor 37 is arranged on the common rail 26. The rail pressure sensor 37 is electrically connected to a signal receiver module 33 of the control device 30 via a sensor signal line 38 and a sensor signal input 35, and said rail pressure sensor 37 makes available to the control device 30 a pressure measuring signal which is necessary for controlling the pressure.

Via control signal outputs 36 and corresponding control signal lines 39, the control device 30 is electrically connected to the high-pressure pump 24, the metering valve 23 and the pressure control valve 25 in order to actuate these components.

The pressure control valve is also connected to the fuel return line 27 in order again to feed back into the fuel tank 21 the fuel outflow which occurs during the pressure control process.

What is claimed is:

1. A method for determining a actual start of injection of a fuel injection valve having a piezo direct drive of a nozzle needle, the method comprising:
    performing a test injection with an actuation period being sufficiently short that a start of shut-off occurs sufficiently early that the nozzle needle does not reach an opening end position,
    determining a closing time of the nozzle needle by measuring and evaluating an electrical variable of the piezo direct drive, and
    calculating back from the closing time to the actual start of injection via the start of shut-off.

2. The method of claim 1, wherein the electrical variable of the piezo direct drive is a capacitance which can be measured at electrical supply connections of an assigned piezo actuator.

3. The method of claim 1, wherein during the calculating back, the time period between the predefined start of shut-off and the closing time is determined as a closing period of the needle.

4. The method as of claim 3, wherein during the calculating back, an opening period of the needle is determined on the basis of the closing period by combination with a proportionality factor.

5. The method of claim 4, wherein the proportionality factor is determined from a ratio between a closing speed and an opening speed of the nozzle needle.

6. The method of claim 4 or 5, wherein the actual start of injection is determined starting from the closing time by subtracting the closing period and the opening period.

7. The method of claim 4, wherein the associated proportionality factors are determined in advance as a function of a working pressure of the fuel injection valve and are made available during operation in a characteristic diagram, in order to calculate the actual start of injection.

8. A device for actuating a fuel injection valve having a piezo direct drive, having a computing unit and a memory unit, and having a computer program stored in non-transitory computer-readable media and executable to:
    actuate a test injection with an actuation period being sufficiently short that a start of shut-off occurs sufficiently early that a nozzle needle does not reach an opening end position,
    determine a closing time of the nozzle needle by measuring and evaluating an electrical variable of the piezo direct drive, and
    calculate back from the closing time to an actual start of injection via the start of shut-off.

9. The device of claim 8, wherein the electrical variable of the piezo direct drive is a capacitance which can be measured at electrical supply connections of an assigned piezo actuator.

10. The device of claim 8, wherein during the calculating back, a time period between the predefined start of shut-off and the closing time is determined as a closing period of the needle.

11. The device of claim 10, wherein during the calculating back, an opening period of the needle is determined on the basis of the closing period by combination with a proportionality factor.

12. The device of claim 11, wherein the proportionality factor is determined from ratio between a closing speed and an opening speed of the nozzle needle.

13. The device of claim 11, wherein the actual start of injection is determined starting from the closing time by subtracting the closing period and the opening period.

14. The device of claim 11, wherein associated proportionality factors are determined in advance as a function of a working pressure of the fuel injection valve and are made available during operation in a characteristic diagram, in order to calculate the actual start of injection.

* * * * *